Patented Aug. 30, 1938

2,128,864

UNITED STATES PATENT OFFICE 2,128,864

POWER DRIVEN LOG SAW

John P. Umhoefer, Cleghorn, Gerhard H. Albers, Cherokee, and John R. Albers, Sioux City, Iowa; said Gerhard H. Albers assignor of one-sixth to said Umhoefer and one-sixth to said John R. Albers Application July 20, 1936, Serial No. 91,450

1 Claim. (Cl. 143—63)

Our invention relates to a power driven log saw.

An object of our invention is to provide a log saw which can be power-driven from the rear end of the tractor.

A further object of our invention is to provide an equalizing mechanism which will prevent the power driven saw from tilting at too great an angle from the normal, substantially horizontal position.

A further object of our invention in so equalizing the position of the saw, is to provide an auxiliary mechanism which during reciprocation of the saw provides compensating features between the driving points to provide such equalization.

A further object of our invention is to provide a saw of this character which will provide such compensating features regardless of the height of the saw above the ground during the cutting operation.

A further object of our invention is to provide means for holding the log securely by means of an attached device during the cutting operation.

A further object of our invention is to provide the above mentioned objects in a construction which involves a minimum number of parts and which can be manufactured at a very reasonable cost.

With these and other objects in view, our invention consists in the construction, arrangement and combination of the various parts of our device, whereby the objects contemplated are attained, as hereinafter more fully set forth, pointed out in our claims, and illustrated in the accompanying drawing, in which:

The principal difficulty encountered in any type of reciprocating saw of a power type, is the fact that due to the reciprocating of a crank arm, the saw blade itself, during the forward and rearward strokes will ride at a substantial angle to the ground, which interferes seriously with the correct operation of the saw. Furthermore, if the crank were connected to a reciprocating portion guided by the proper channels, etc., this would involve a needless multiplicity of parts, which would involve a larger and more cumbersome apparatus.

A principal object of our invention is to provide an equalizing feature which maintains the saw at a practically horizontal position at all portions of the stroke by means of suitable members, which eliminate cumbersome apparatus and many parts, and reduces the saw to a simple structure involving only a few members.

Figure 1:
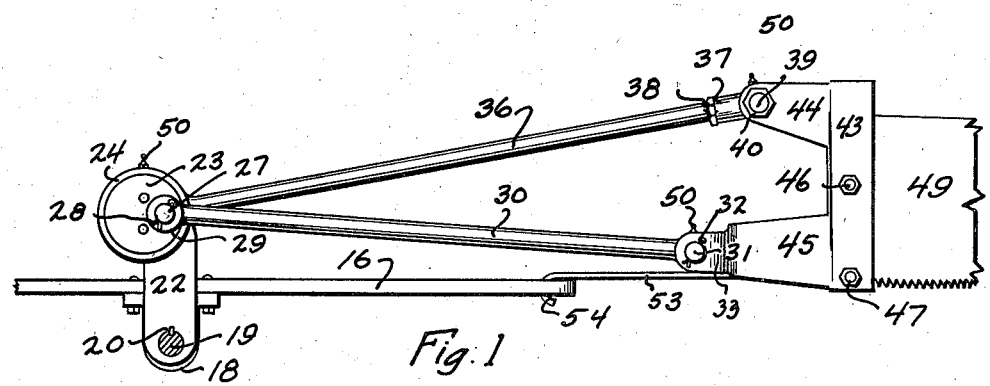
Figure 1 is a side elevation of a detail of the operating mechanism.

We have used the character 10 to designate generally the rear portion of a standard power driven tractor with the character 11 indicating the rear wheels of the same. Our device is driven from the standard shaft 12, which in turn is keyed to the further shaft 13 by means of a coupling 14. The shaft 13 is journalled within the upper bearing 15, which is attached to the draw bar 16. A smaller sprocket 17 is keyed to the shaft 13. A further bearing 18 is attached beneath the draw bar 16 and through the same passes a shaft 19, which is suitably keyed at 20 to the functioning portions of the saw, which will be explained. Attached to the shaft 19 is the larger sprocket wheel 20 which is spaced a slight distance apart from the smaller sprocket 17. A suitable chain drive is provided at 21, which passes over both sprockets. Keyed to the shaft 19 is the arm 22, which arm is rigidly attached and forms an integral part of the inner cam 23, which rides within the ring 24. A suitable plate, such as 25, is attached over the ring 24 by means of the cap screws 26 and the plate is shown removed in Figure 1 to illustrate the operation more clearly.

Figure 2:
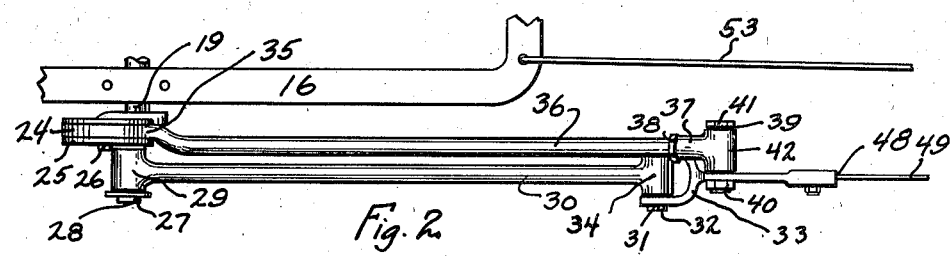
Figure 2 is a plan view of Figure 1.

A shaft member 27 is rigidly attached, as well as eccentrically to the cam member 23 so that this shaft rides in a circle about the center of the cam. The shaft 27 is keyed at 28, and journalled upon this shaft is the hub 29, which comprises one end of the lengthened rod 30. The rod 30 is journalled upon the shaft 31, which is keyed at 32 and which shaft passes between the fork member 33 with a further journalling member 34, which is an integral extension of the rod 30 receiving the aforesaid shaft 31. Rigidly attached to the outer ring at 35 is the further rod 36, which passes to the adjusting coupling at 37, which clamp is adjusted at the nut 38, and which coupling 37 is in turn journalled upon the shaft 39, which is locked by means of the nut 40 on one side and the further nut 41. The coupling 37 terminates in the outer journalled member 42 for receiving the shaft 39. The shafts 31 and 39 are thus pivotally engaged with the frame 43, which secures one end of the saw. The member 43 includes the extended arms 44 and 45 for adaptation to such pivotal engagement, and includes the bolts 46 and 47. A slot is provided at 48, (see Fig. 2), which receives the larger end of the saw 49. The saw 49 is of the standard construction and includes suitable openings for receiving the bolts 46 and 47, which are then clamped. Various oil cups are provided at necessary points, as indicated by the character 50.

Now that the structure of our device has been explained, we shall explain the operation thereof. It will be noted through the power drive from the shaft of the tractor, that the shaft 19 is driven at a certain rate of speed which of course is governed by the ratio between the sprockets. During rotation of the shaft 19, the arm 22 will be likewise turned, which normally is in a clockwise direction as applied to the figures. If a straight mechanical connection were made from the end of the arm 22, the natural tendency would be for the saw 49 to tilt to extreme angles during forward and rearward strokes.

However, in the present structure, during rotation of the arm 22, it will be noted that the compensating feature is effected in our mechanism in the following manner. Assuming as stated, that the device is running in a clockwise direction, it will be noted that the ring 24 is rigidly connected to the rod 36 as an integral formation. The natural tendency during such rotation then would be for the rod 36 in the forward or upper portion of the stroke to tilt the extreme end of the saw downwardly. However, due to the fact that the shaft 27 is eccentrically mounted on the cam 23 at this portion of the stroke, the tendency is for the rod 30 to be pushed forwardly in the direction of the saw blade thereby forcing the lower end of the member 43 to rock upon the upper shaft 39, which equalizes the above described tendency so that the saw rides upon a practically uniform horizontal plane. Likewise on the lower portion of the stroke, if the rod 36 is being drawn away from the direction of the blade thereby tending to raise the outer end of the same, the rod 30 will also be drawn away from the blade in the same manner thereby rocking the member 43 about the shaft 39 in a reverse direction and again maintaining the same normal horizontal positioning of the blade. In other words, the eccentricity of the shaft 27 from the direct center of the cam 23 provides the compensating feature above described, since the said eccentricity is made just sufficient and the cam action is applied at the proper portions of the stroke to provide the above described result.

Figure 3:
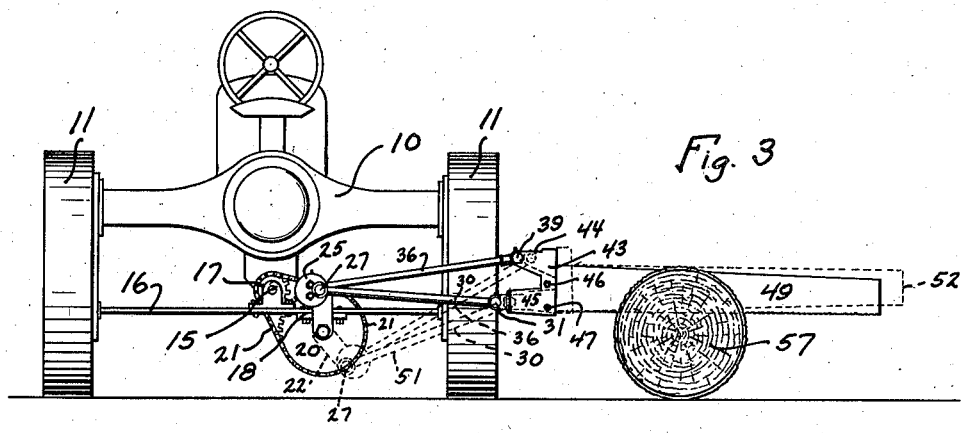
Figure 3 is a rear elevation showing the device in operation and as attached to the rear of a tractor.
Figure 4:
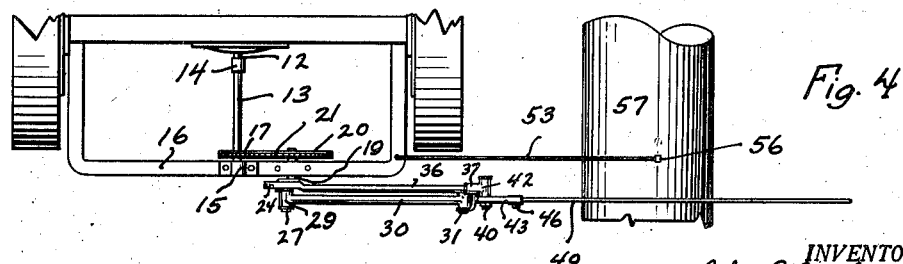
Figure 4 is a plan view of Figure 3.

Figure 3 illustrates in dotted lines a lower position, as at 51, wherein the arm 22 is at the lower portion of the stroke, and it will be seen that the pivoting point 27 is at the left of the cam to compensate for horizontal positioning of the blade, since at this point of the stroke the upper rod 36 is also being pulled in the same direction thus providing the necessary compensation. The compensation is so made that a slight tilting effect is obtained during the forward motion of the saw to the right and a slight tilting to the left during the reverse motion. The reason for this is to provide a more efficient action against the grain of the log, as well as to clean out the saw-dust accumulated within the crevice. It will be understood of course that this tilting effect is only at a minimum for the necessary purpose and is designated approximately at 52 in Figure 3.

The cam arrangements are so adjusted that the saw rides horizontally at practically any raised or lowered height of the blade, so that during the lower parts of the cutting operation or when the log is nearly sawed through, the blade will rest evenly. However, at such lower points near the ground the tilting action, above described, insures that during the forward stroke, only the extreme outer teeth of the saw will bear against the ground thereby preventing injury to a greater number of such teeth.

As an auxiliary device to the saw, we provide the rod member 53, which includes a small hook 54, which is received within in any of the usual openings 55 in the draw bar. The rod 53 terminates in the member 56, which includes a small wedge-shaped point at the bottom thereof, which is driven into the log 57 adjacent to the blade before the sawing operation starts. In this manner, the log is held rigidly at the point of cutting so that it will not sway.

It will now be seen that we have provided a power driven log saw which can be driven from the rear end of a tractor, which positively prevents extreme angular tilting of the saw blade, which provides unique compensating features for maintaining the blade at a substantial horizontal level, which provides equalizing features during any positioning of the blade, which involves only the use of a minimum number of parts in the construction thereof, and which can be manufactured at a reasonable cost.

Some changes may be made in the construction and arrangement of the parts of our invention without departing from the real spirit and purpose of our invention, and it is our intention to cover by our claims any modified forms of structure or use of mechanical equivalents, which may be reasonably included within their scope.

We claim as our invention:

A power driven log saw comprising a crank arm for attachment to a driven shaft, a frame for attachment to one end of a saw blade, means movably engaged with the crank arm to maintain the saw blade at a horizontal level during all portions of the stroke thereof, including a circular cam eccentrically and integrally attached to the arm, a ring slidably arranged about the circular cam, a rod pivotally and eccentrically attached to said circular cam and to the frame, means connecting the ring to the frame.

JOHN P. UMHOEFER.
GERHARD H. ALBERS.
JOHN R. ALBERS.